US007744047B2

(12) United States Patent
Thorn

(10) Patent No.: US 7,744,047 B2
(45) Date of Patent: Jun. 29, 2010

(54) ROTARY NECK CRADLE

(76) Inventor: Ron Thorn, 815 Western Ave., Glendale, CA (US) 91201

( * ) Notice: Subject to any disclaimer, the term of this patent is extended or adjusted under 35 U.S.C. 154(b) by 0 days.

(21) Appl. No.: 12/319,325

(22) Filed: Jan. 6, 2009

(65) Prior Publication Data

US 2009/0173851 A1 Jul. 9, 2009

Related U.S. Application Data

(60) Provisional application No. 61/010,343, filed on Jan. 8, 2008.

(51) Int. Cl.
*F16M 11/04* (2006.01)

(52) U.S. Cl. .................... 248/176.3; 248/371; 248/351; 248/357; 5/636; 84/327; 297/423.46

(58) Field of Classification Search ............. 248/176.3, 248/671, 146, 149, 371, 176.1, 351, 357, 248/118, 346.01, 346.06, 346.11, 688, 687; 5/636, 637; 297/423.46, 423.1, 423.39, 423.41, 297/423.43, 423.44, 423.45; 84/327, 453
See application file for complete search history.

(56) References Cited

U.S. PATENT DOCUMENTS

| | | | | |
|---|---|---|---|---|
| 1,464,279 | A | 8/1923 | Hindley | |
| 1,684,912 | A | 9/1928 | Dunklau | |
| 1,772,308 | A | 8/1930 | Ezzelle | |
| 2,244,440 | A * | 6/1941 | Archer | 5/633 |
| 2,509,086 | A * | 5/1950 | Eaton | 5/636 |
| 2,522,345 | A | 9/1950 | Cashiopp | |
| 3,667,803 | A * | 6/1972 | Ford | 297/423.44 |
| 3,958,786 | A | 5/1976 | Mann | |
| 4,205,818 | A | 6/1980 | Lawler | |
| 4,352,480 | A | 10/1982 | Gathright | |
| 4,504,050 | A * | 3/1985 | Osborne | 5/637 |
| 5,363,734 | A | 11/1994 | Wilenken | |
| 5,381,717 | A | 1/1995 | Brokaw | |
| 5,396,824 | A | 3/1995 | Souza, Jr. | |
| 5,622,344 | A | 4/1997 | Gracie | |
| 5,941,490 | A | 8/1999 | Pearse | |
| 6,113,182 | A * | 9/2000 | Wise | 297/423.41 |
| 6,433,265 | B1 | 8/2002 | McConville | |
| 7,322,063 | B2 * | 1/2008 | Esimai | 5/652.1 |
| 2007/0252061 | A1 | 11/2007 | Feetham et al. | |

* cited by examiner

*Primary Examiner*—Anita M King
(74) *Attorney, Agent, or Firm*—Suiter Swantz pc llo

(57) ABSTRACT

A support device for supporting a musical instrument includes a base, the base includes a first side portion and a second side portion. The support device also includes a support body rotatably coupled to the base. The support body includes a first support surface and a second support surface. The first support surface defines a channel in the support body, the second support surface is substantially planar. The support body is configured to rotate between at least a first position and a second position around an axis intersecting the first side portion and the second side portion.

19 Claims, 6 Drawing Sheets

ROTARY NECK CRADLE

CROSS-REFERENCE TO RELATED APPLICATIONS

The present application claims the benefit under 35 U.S.C. §119(e) of U.S. Provisional Application Ser. No. 61/010,343, filed Jan. 8, 2008. Said U.S. Provisional Application Ser. No. 61/010,343 is herein incorporated by reference in its entirety.

FIELD OF THE INVENTION

The present invention generally relates to the field of support devices, and more particularly to a support device for supporting musical instruments.

BACKGROUND OF THE INVENTION

Musical instruments, such as stringed musical instruments including acoustic guitars, electrical guitars, bass guitars, and the like, may require setup and periodic maintenance for proper function and performance. During manufacture, setup, and maintenance, the instrument may be subjected to various forces associated with manipulating and working on the instrument. These forces may damage the instrument. A support device may be used to mitigate some of the forces on the instrument.

SUMMARY OF THE INVENTION

A support device for supporting a musical instrument includes a base. The base includes a first side portion and a second side portion. The support device also includes a support body rotatably coupled to the base. The support body includes a first support surface and a second support surface. The first support surface defines a channel in the support body, the second support surface is substantially planar. The support body is configured to rotate between at least a first position and a second position around an axis intersecting the first side portion and the second side portion.

A support device for supporting a neck of a musical instrument includes a base. The base includes a first side portion and a second side portion. The support device also includes a support body rotatably coupled to the base. The support body includes a first support surface and a second support surface. The first support surface defines a channel in the support body, the second support surface is substantially planar. The support device further includes at least one pin for rotatably coupling the support body to the base. The at least one pin engages the support body and at least one of the first side portion or the second side portion. The support body is configured to rotate between at least a first position and a second position around an axis defined by the at least one pin.

A support device for supporting a neck of a musical instrument includes a base. The base includes a first side portion and a second side portion. The support device also includes a support body rotatably coupled to the base. The support body includes a first support surface and a second support surface. The first support surface defines a channel in the support body, the second support surface is substantially planar. The support device further includes means for rotatably coupling the support body to the base. The rotatably coupling means engages the support body and at least one of the first side portion or the second side portion. The support body is configured to rotate between at least a first position and a second position around an axis intersecting the first side portion and the second side portion.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
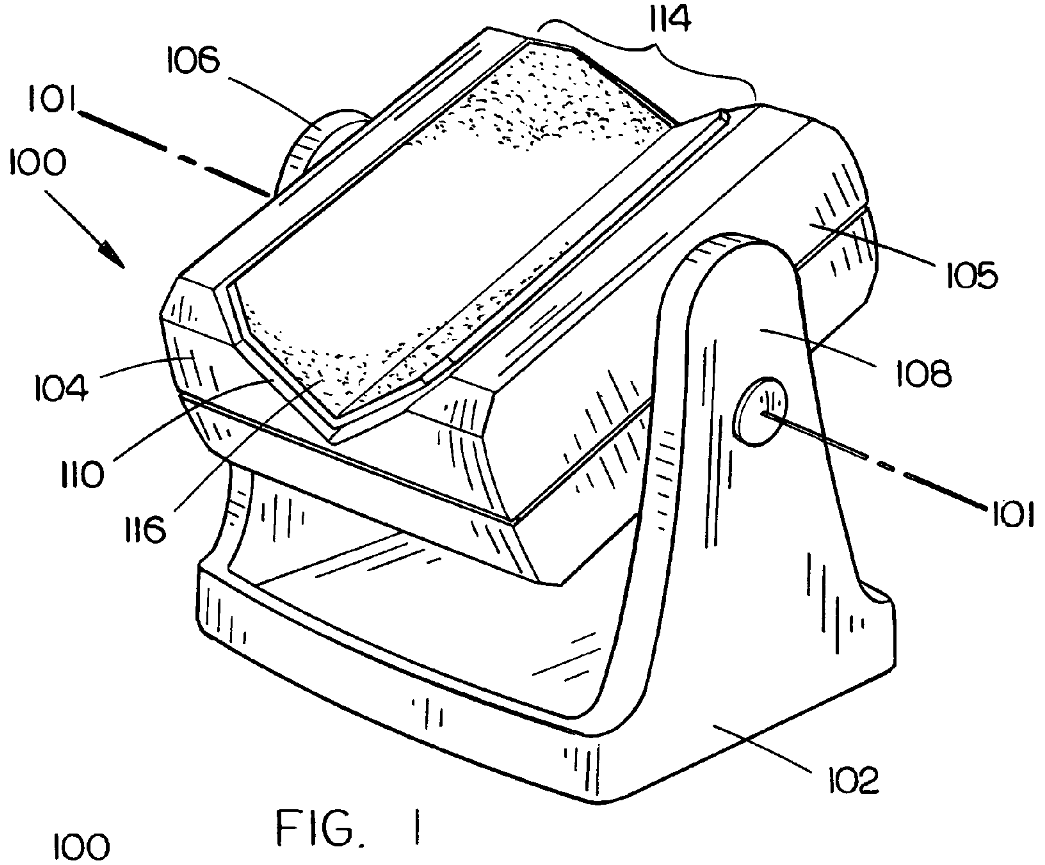
FIG. 1 is an isometric view of a support device in a position between a first position and a second position.
Figure 2:
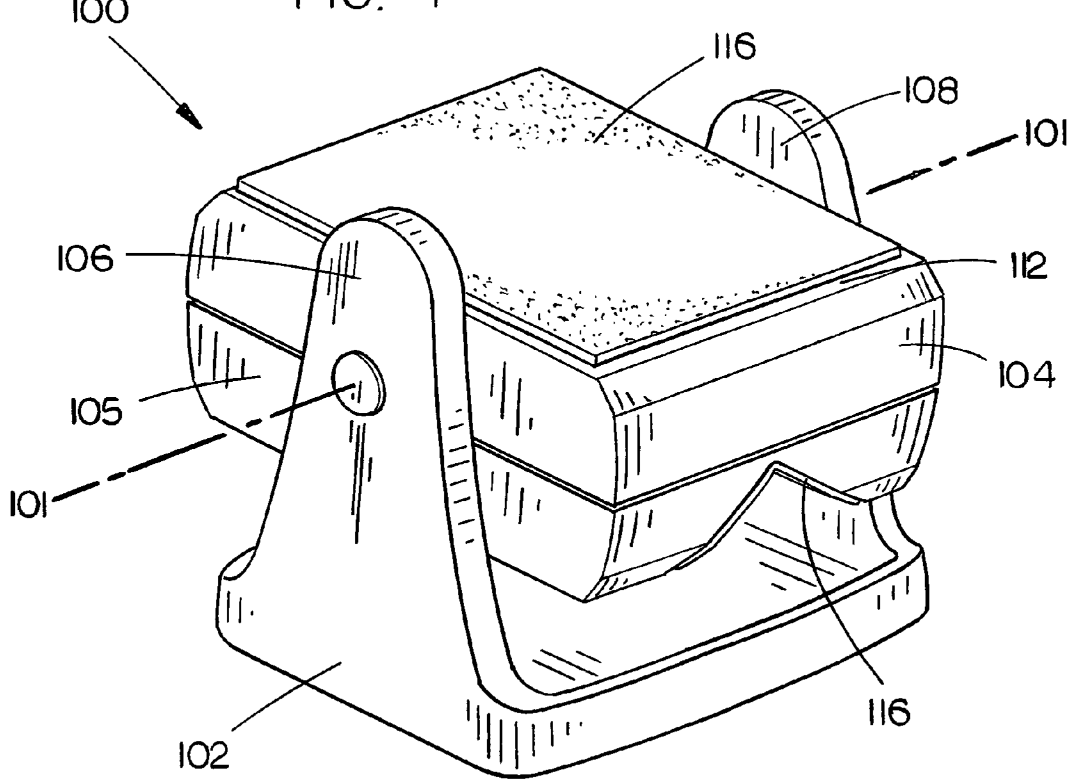
FIG. 2 is an isometric view of the support device of FIG. 1 in the second position.
Figure 3:
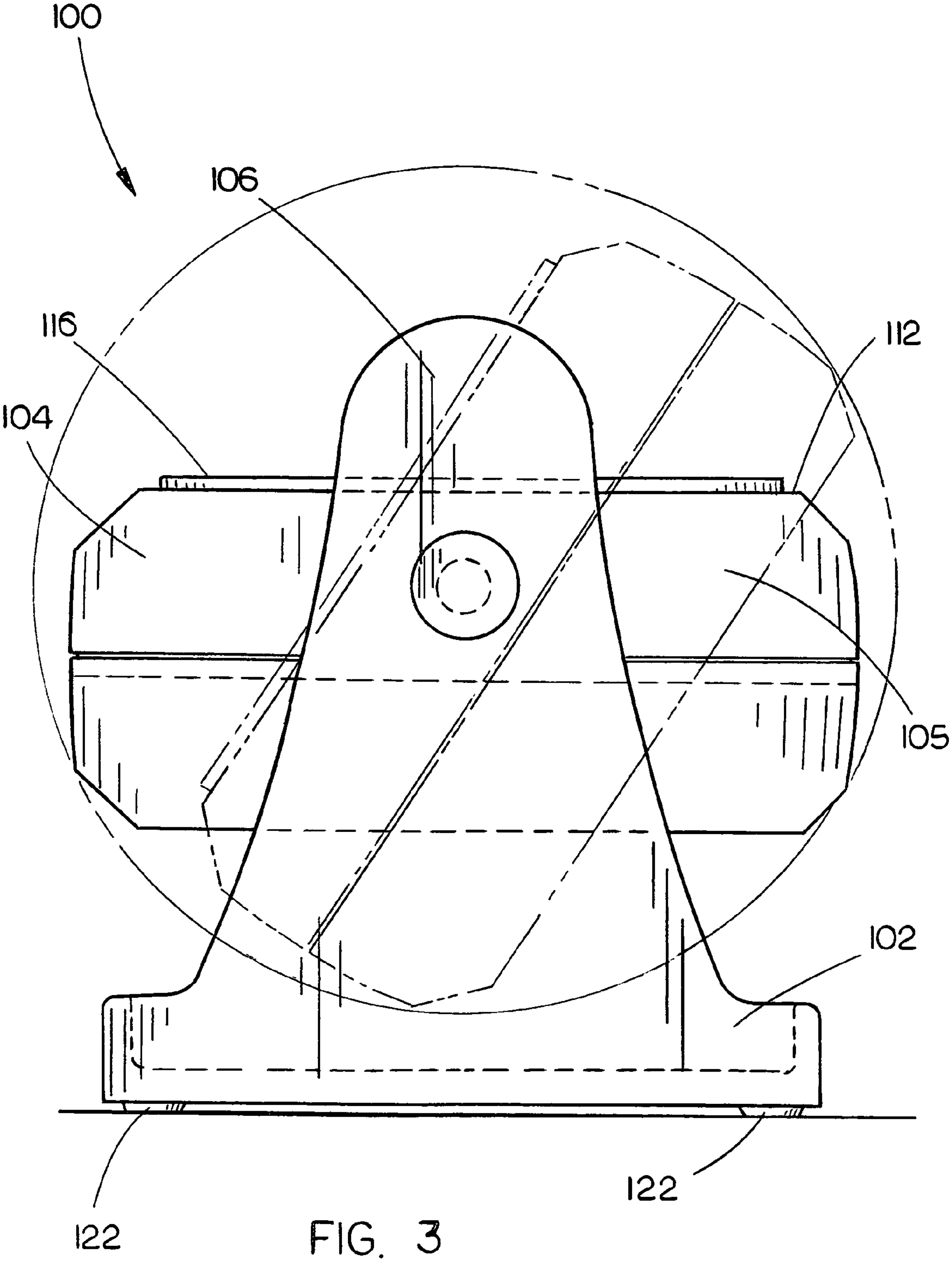
FIG. 3 is a side view of the support device of FIG. 1, displaying a support body rotating between the first position and the second position.
Figure 4:
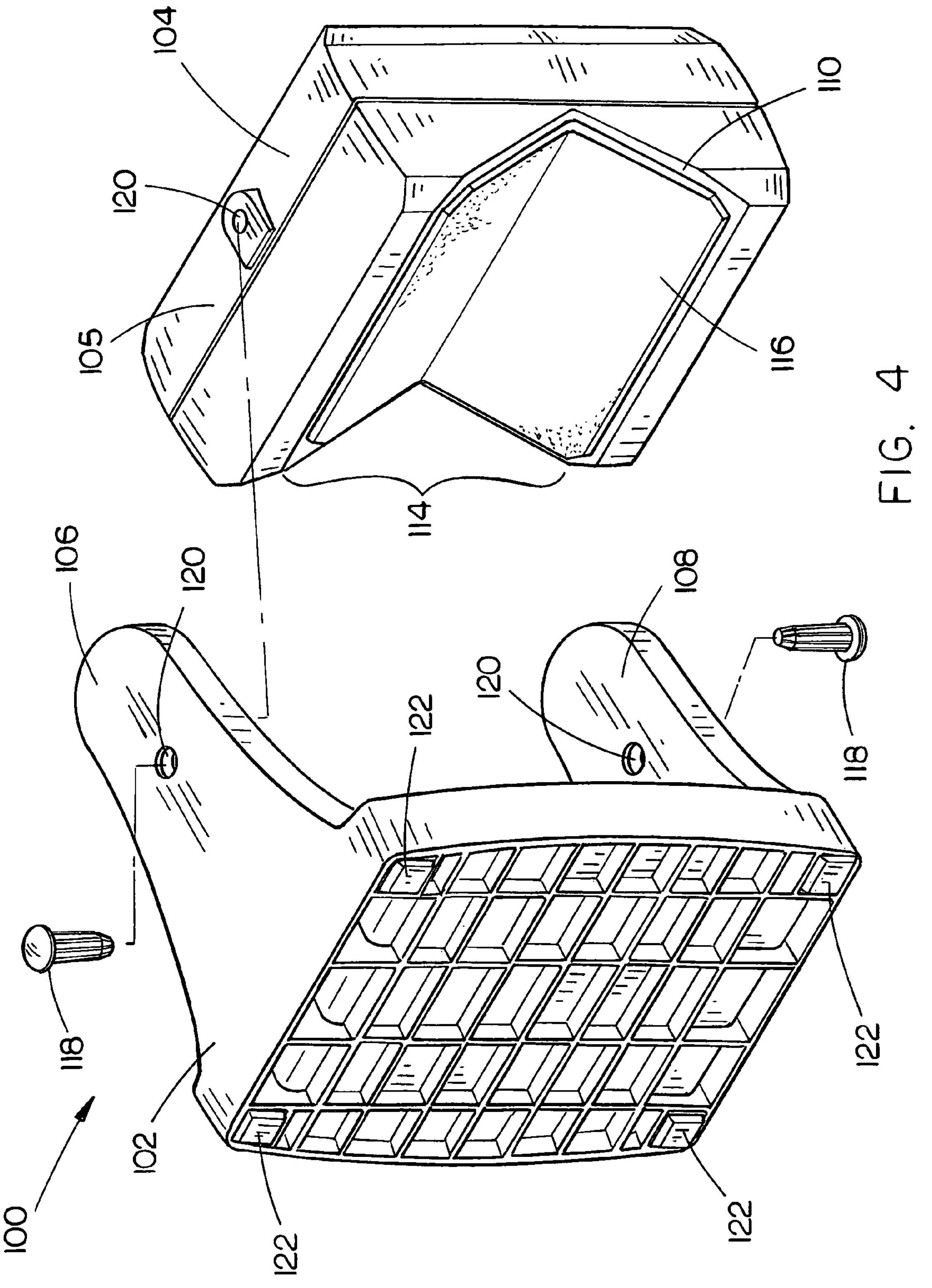
FIG. 4 is an exploded view of the support device of FIG. 1.
Figure 5:
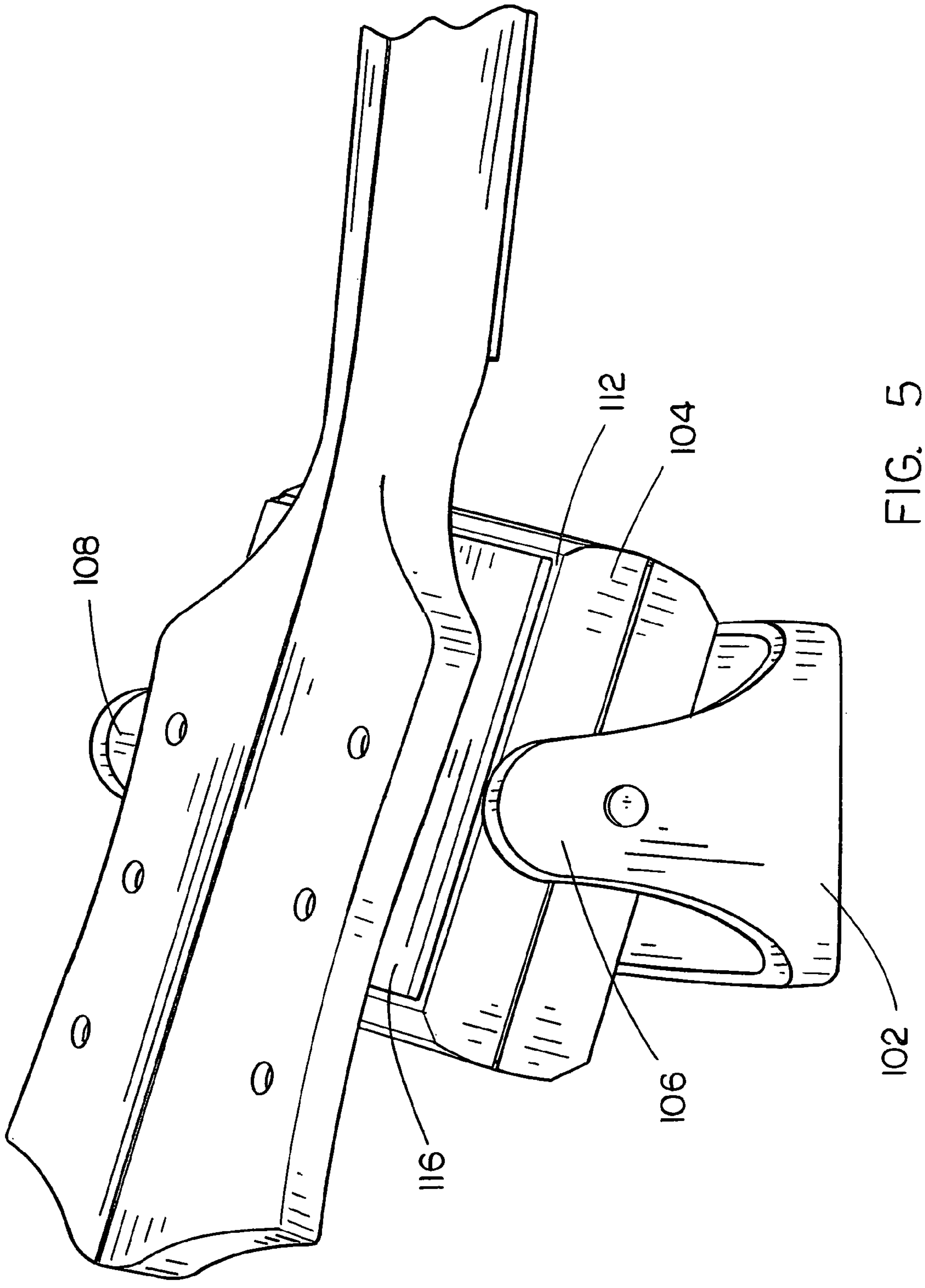
FIG. 5 is a perspective view of the support device of FIG. 1 supporting a portion of a musical instrument, the support device being in a position in between the first position and the second position.
Figure 6:
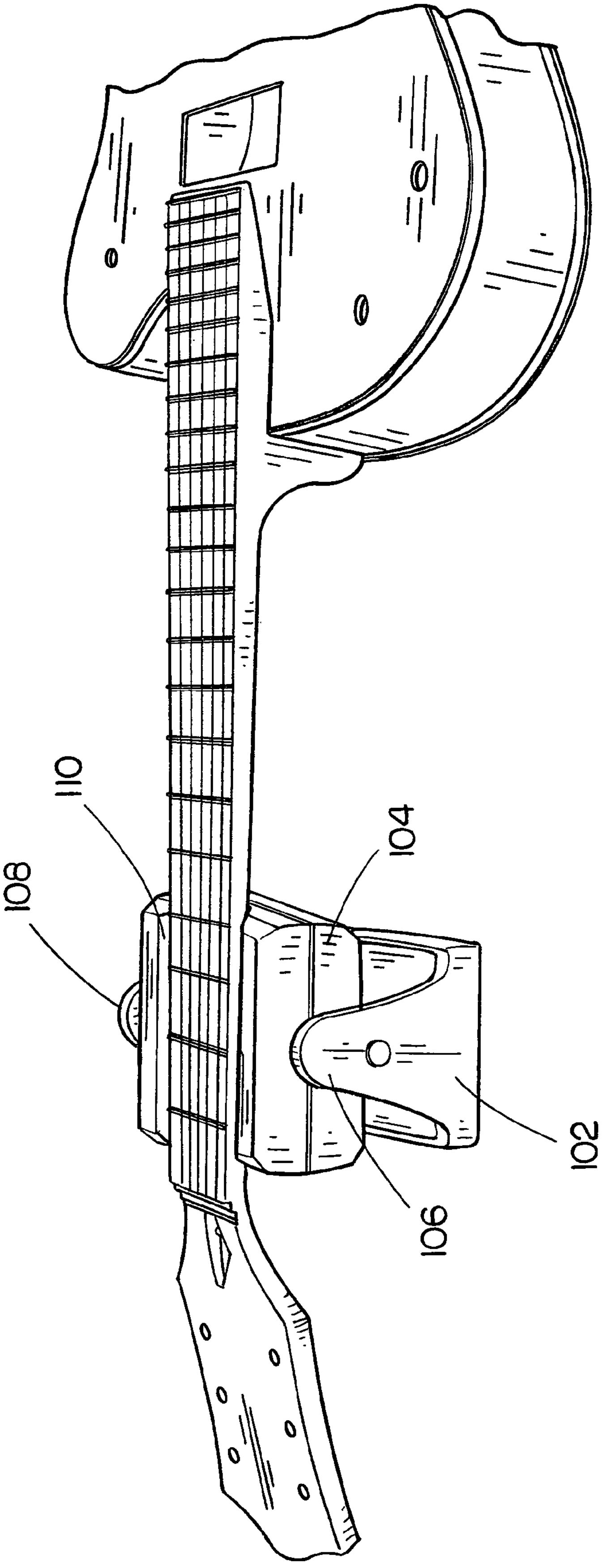
FIG. 6 is a perspective view of the support device of FIG. 1 supporting a portion of a musical instrument, the support device being in the first position.

Referring generally to FIGS. 1-7, a support device 100 is shown according to embodiments of the present disclosure. The support device 100 may include a base 102 and a support body 104. The support body 104 may be rotatably coupled to the base 102, such that the support body 104 may rotate about an axis 101 relative to the base 102. In a particular embodiment, the base 102 includes a first side portion 106 and a second side portion 108 between which the support body 104 may be rotatably coupled. For instance, the support body 104 may rotate about an axis 101 which intersects the first side portion 106 and the second side portion 108. The axis 101 may be substantially perpendicular to each of the first side portion 106 and the second side portion 108. The support body 104 may rotate between a first position (as indicated in FIG. 6) and a second position (as indicated in FIG. 2). The rotation may be a complete rotation, as indicated in FIG. 3. The first position may be configured such that the support body 104 extends beyond each of the first side portion 106 and the second side portion 108. The second position may be configured such that each of the first side portion 106 and the second side portion 108 extend beyond the support body 104. For example, when the support body 104 is in the first position or the second position, the axis 101 may intersect the support body 104 at points on opposing support body side panels 105 displaced vertically from a midpoint on opposing support body side panels 105.

Figure 7:
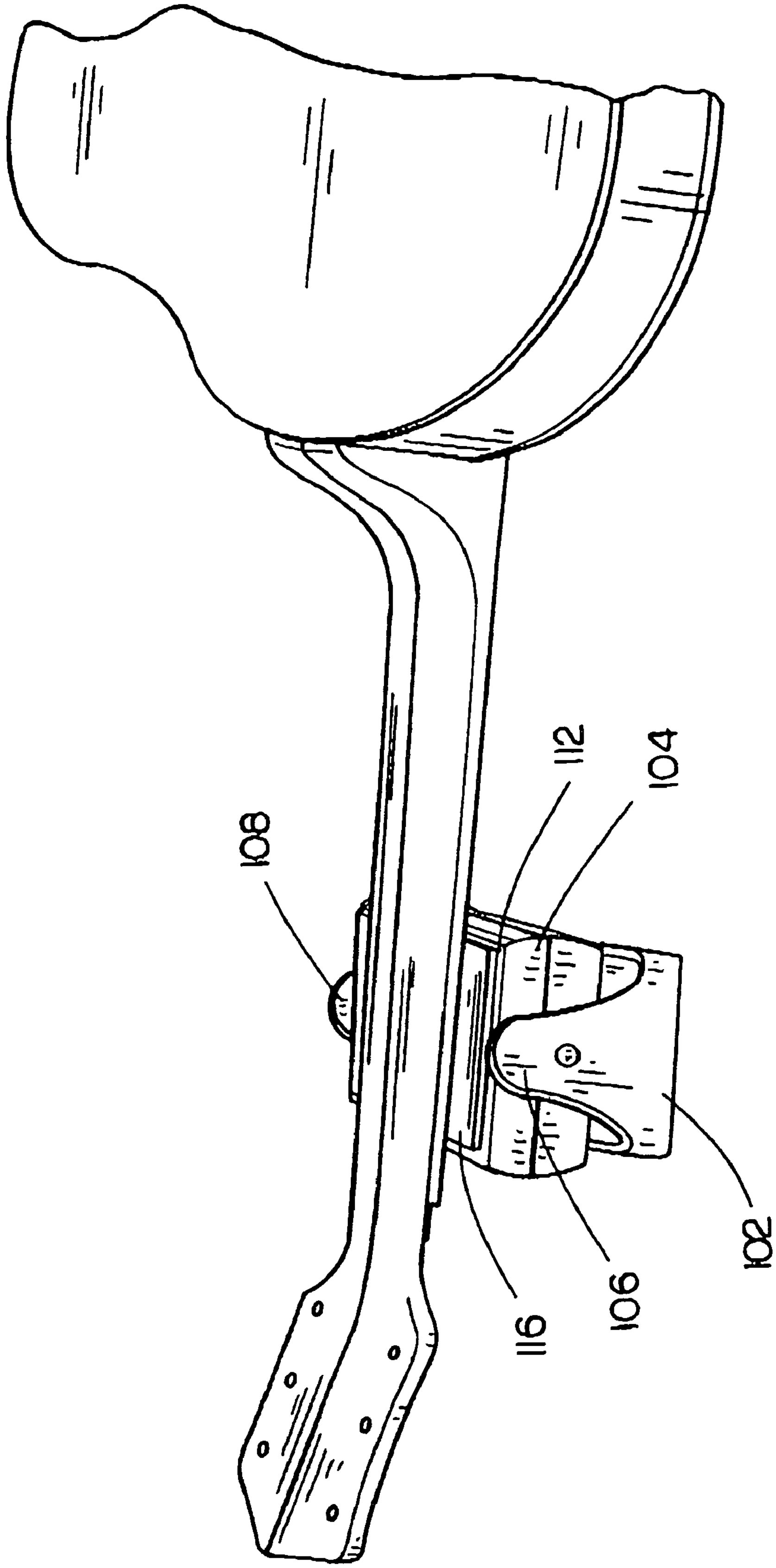
FIG. 7 is a perspective view of the support device of FIG. 1 supporting a portion of a musical instrument, the support device being in a position in between the first position and the second position.

The support body 104 may include a first support surface 110 and a second support surface 112. In an embodiment, the first support surface 110 and the second support surface 112 are opposite each other on the support body 104. The first support surface 110 may define a channel 114 in the support body. In a particular embodiment, the channel 114 extends the length of the support body 104, running approximately perpendicularly to axis 101, about which support body 104 rotates. The second support surface 112 may be approximately planar. As shown in FIGS. 5 and 7, the second support surface may be configured to support a portion of a musical instrument, such as the headstock of a guitar. In this instance, the support body 104 is in a position between the first position and the second position. Additionally, the second support surface 112 may support a plurality of different portions of a musical instrument, including the neck (as shown in FIG. 7), which may further include frets, at any number of different angles. As shown in FIG. 6, the channel 114 may be configured to receive a neck of a musical instrument, such as the neck of an acoustic guitar, an electrical guitar, a bass guitar, and the like. In this instance, the support body 104 is in the first position, which may allow the channel 114 to support the neck of a guitar while the guitar body remains prone and supported on a surface. However, since the support body 104 may rotate at any angle between the first position and the second position, the first support surface 110 may support the neck or other portion of a musical instrument having a variety of body thicknesses.

The first support surface 110 and the second support surface 112 may each include a support material 116 deposited on, adhered to, or coupled with each surface. The support material 116 may traverse the length of channel 114 and retain the shape of channel 114. The support material 116 on the second support surface 112 may remain substantially planar. The support material 116 may comprise a rubber product (such as a synthetic or natural rubber product), neoprene, or of a foam construction, such as an open cell construction, a closed cell construction, a small cell construction (e.g., memory foam), foam rubber, polyurethane foam, polyether foam or a comparable foam product, and the like. Additionally, the support material 116 may include cork or a compressed material, such as compressed fibers, or other suitable material used in the art. For example, the support material 116 may be suitable to cushion portions of musical instruments that are supported, which may protect the portions from damage. Additionally, the support material 116 may provide stability to the musical instrument by providing a surface on which portions of musical instruments may avoid slipping or moving.

The support device 100 may further include at least one pin 118 for rotatably coupling the support body 104 to the base 102. For instance, the pin 118 may engage the support body 104 and at least one of the first side portion 106 or the second side portion 108. In one embodiment, each of the first side portion 106 and the second side portion 108 define an aperture 120 through which the pin 118 may pass. Additionally, the support body 104 may define apertures 120 in the opposing support body side panels 105. The apertures 120 defined by the support body 104 may penetrate the entire width of the support body 104 (e.g., for use with a single pin), or may penetrate a portion of support body 104 (e.g., for use with multiple pins 118). In the exploded view depicted in FIG. 4, two pins 118 are shown, wherein each pin 118 engages the support body 104 via an aperture 120 defined by one of the first side portion 106 or the second side portion 108. However, it may be appreciated that the support device 100 include a single pin for engaging the support body 104 via apertures in both of the first side portion 106 and the second side portion 108, the single pin providing the axis about which the support body 104 rotates in relation to the base 102. Additionally, the pin 118 may be configured to selectively lock the support body 104 in a particular position, such that the rotation of the support body 104 about axis 101 is substantially hindered or prohibited when a locking function of the pin 118 is enabled. For instance, a portion of the pin 118 may be configured to engage the outer surface of the material which defines the aperture 120. However, it may be appreciated that another mechanism, such as a separate locking mechanism on base 102 or support body 104, be configured to selectively lock the support body 104 in a particular position about the axis 101.

It may further be appreciated that the support device 100 includes means for rotatably coupling the support body 104 to the base 102. The rotatably coupling means may engage the support body 104 and at least one of the first side portion 106 or the second side portion 108. The rotatably coupling means may include pins and apertures (such as shown in FIG. 4, discussed above). The rotatably coupling means may also include apertures on the support body for receiving rods extending from each of the first side portion 106 and the second side portion 108. The rotatably coupling means may additionally include apertures on each of the first side portion 106 and the second side portion 108 for receiving rods extending from each of the corresponding support body side panels 105. The rotatably coupling means may further include ball and socket pivot points between the support body 104 and each of the first side portion 106 and the second side portion 108. The rotatably coupling means may include any other device known in the art for securing the support body 104 to the base 102 while allowing the support body 104 to rotate on an axis relative to the base 102.

The support device 100 may additionally include at least one surface contact 122 coupled to the base 102. The at least one surface contact may be coupled to the base 102 opposite the first side portion 106 and the second side portion 108. In the embodiment depicted in FIG. 4, the base 102 includes four surface contacts 122, with each surface contact 122 positioned approximately in each corner of the base 102. The surface contacts 122 may adhere to the base 102 such that the support device 100 remains relatively stationary when the surface contacts 122 interact with a surface (e.g., a table, a workbench, and the like). The surface contact 122 may comprise a material that is the same as support material 116, or may be a different material known in the art, suitable for maintaining stability of the support device 100 against a surface.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A support device for supporting a musical instrument, comprising:

a base, the base including a first side portion and a second side portion; and a support body rotatably coupled to the base, the support body including a first support surface and a second support surface, the first support surface defining a channel in the support body, the second support surface being substantially planar, wherein the support body is configured to rotate between at least a first position and a second position around an axis intersecting the first side portion and the second side portion, each of the first side portion and the second side portion extend beyond all of the support body in a direction opposite the base when the support body is in the second position, and the support body extends beyond each of the first side portion and the second side portion in a direction opposite the base when the support body is in the first position.

2. The support device of claim 1, wherein the first support surface and the second support surface each include a support material, the support material having a composition different than the composition of the support body.

3. The support device of claim 2, wherein the composition of the support material is at least one of neoprene, a synthetic rubber product, a natural rubber product, a foam product, cork, or a compressed material.

4. The support device of claim 1, wherein the axis is substantially perpendicular to each of the first side portion and the second side portion.

5. The support device of claim 1, wherein the support body defines at least two apertures, each of the at least two apertures defined by one of corresponding support body side panels, the corresponding support body side panels being adjacent to the first support surface and the second support surface.

6. The support device of claim 5, wherein the first side portion and the second side portion each define at least one aperture.

7. The support device of claim 6, further including at least one pin, the at least one pin providing an axis about which the support body may rotate, the at least one pin configured to engage one of the two apertures defined by the corresponding support body side panels and to engage one of the at least one aperture defined by each of the first side portion and the second side portion.

8. The support device of claim 1, wherein the base further includes at least one surface contact, the surface contact positioned opposite the first side portion and the second side portion.

9. A support device for supporting a neck of a musical instrument, comprising:

a base, the base including a first side portion and a second side portion;

a support body rotatably coupled to the base, the support body including a first support surface and a second support surface, the first support surface defining a channel in the support body, the second support surface being substantially planar; and at least one pin for rotatably coupling the support body to the base, the at least one pin engaging the support body and at least one of the first side portion or the second side portion, wherein the support body is configured to rotate between at least a first position and a second position around an axis defined by the at least one pin, each of the first side portion and the second side portion extend beyond all of the support body in a direction opposite the base when the support body is in the second position, and the support body extends beyond each of the first side portion and the second side portion in a direction opposite the base when the support body is in the first position.

10. The support device of claim 9, wherein the first support surface and the second support surface each include a support material, the support material having a composition different than the composition of the support body.

11. The support device of claim 10, wherein the composition of the support material is at least one of neoprene, a synthetic rubber product, a natural rubber product, a foam product, cork, or a compressed material.

12. The support device of claim 9, wherein the axis is substantially perpendicular to each of the first side portion and the second side portion.

13. The support device of claim 9, wherein the at least one pin engages the support body via at least one aperture defined by one of corresponding support body side panels, the corresponding support body side panels being adjacent to the first support surface and the second support surface.

14. The support device of claim 9, wherein the at least one pin engages the at least one of the first side portion or the second side portion via at least one aperture defined by each of the first side portion and the second side portion.

15. The support device of claim 9, further including at least one surface contact coupled to the base, the surface contact positioned opposite the first side portion and the second side portion.

16. A support device for supporting a neck of a musical instrument, comprising:

a base, the base including a first side portion and a second side portion;

a support body rotatably coupled to the base, the support body including a first support surface and a second support surface, the first support surface defining a channel in the support body, the second support surface being substantially planar; and means for rotatably coupling the support body to the base, the rotatably coupling means engaging the support body and at least one of the first side portion or the second side portion, wherein the support body is configured to rotate between at least a first position and a second position around an axis intersecting the first side portion and the second side portion, each of the first side portion and the second side portion extend beyond all of the support body in a direction opposite the base when the support body is in the second position, and the support body extends beyond each of the first side portion and the second side portion in a direction opposite the base when the support body is in the first position.

17. The support device of claim 16, wherein the axis is substantially perpendicular to each of the first side portion and the second side portion.

18. The support device of claim 16, wherein the first support surface and the second support surface each include a support material, the support material including at least one of neoprene, a synthetic rubber product, a natural rubber product, a foam product, cork, or a compressed material.

19. The support device of claim 16, further including at least one surface contact coupled to the base, the surface contact positioned opposite the first side portion and the second side portion, the surface contact including at least one of neoprene, a synthetic rubber product, a natural rubber product, a foam product, cork, or a compressed material.

* * * * *